United States Patent
Malka et al.

(10) Patent No.: US 11,556,630 B2
(45) Date of Patent: Jan. 17, 2023

(54) PRIVATE PASSWORD CONSTRAINT VALIDATION

(71) Applicant: Microsoft Technology Licensing, LLC, Redmond, WA (US)

(72) Inventors: Gal Malka, Tel Aviv (IL); Michael Zeev Bargury, Ramat Gan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 16/660,504

(22) Filed: Oct. 22, 2019

(65) Prior Publication Data
US 2021/0117533 A1   Apr. 22, 2021

(51) Int. Cl.
*G06F 21/46* (2013.01)
*G06F 21/62* (2013.01)
(Continued)

(52) U.S. Cl.
CPC .......... *G06F 21/46* (2013.01); *G06F 21/6254* (2013.01); *H04L 9/008* (2013.01); *H04L 63/0428* (2013.01); *G06F 2221/2115* (2013.01)

(58) Field of Classification Search
CPC ............. G06F 21/46; G06F 21/6254; G06F 2221/2115; H04L 63/0428; H04L 9/008
See application file for complete search history.

(56) References Cited

U.S. PATENT DOCUMENTS 9,917,820 B1 *  3/2018  Kolman ............... G06F 21/6227
10,909,235 B1 *  2/2021  Farivar ................. G06F 21/46
(Continued)

FOREIGN PATENT DOCUMENTS

| EP | 3309997 A1 | 4/2018 |
| KR | 101832861 B1 | 4/2018 |
| WO | 2014179887 A1 | 11/2014 |

OTHER PUBLICATIONS

Yanjiang Yang • Jianying Zhou • Jian Weng • Feng Bao; A New Approach for Anonymous Password Authentication; A New Approach for Anonymous Password Authentication; 2009 Annual Computer Security Applications Conference (pp. 199-208); (Year: 2009).*
(Continued)

*Primary Examiner* — Luu T Pham
*Assistant Examiner* — Chao Wang
(74) *Attorney, Agent, or Firm* — Workman Nydegger (57) ABSTRACT

Privately determining whether a password satisfies a constraint without having to divulge the password itself to a third party that evaluates the constraint, and without the third party even being aware of the result of the evaluation. After the user selects a password, private communication (e.g., private information retrieval) is used to determine whether the selected password satisfies password constraints. For instance, the password might be encrypted (e.g., homomorphically), and then the encrypted password and a function definition (e.g., a homomorphic function definition) is then provided to the third party. The third party then performs the function and returns an already encrypted result. The third party generated the encrypted result directly, without having access to the result in the clear. Upon receiving the encrypted result, the user's computing system may then decrypt the result, to find out whether the password satisfies the constraints, and thus is sufficiently safe.

14 Claims, 6 Drawing Sheets

(51) Int. Cl.
*H04L 9/00* (2022.01)
*H04L 9/40* (2022.01)

(56) References Cited

U.S. PATENT DOCUMENTS

| | | | | |
|---|---|---|---|---|
| 2003/0070074 A1* | 4/2003 | Geller | ................... | G06F 21/31 |
| | | | | 713/168 |
| 2015/0227930 A1* | 8/2015 | Quigley | ............... | H04L 9/3226 |
| | | | | 705/72 |
| 2015/0295712 A1* | 10/2015 | Veugen | ................ | H04L 9/3271 |
| | | | | 713/153 |
| 2018/0176188 A1* | 6/2018 | Zhu | ......................... | G06F 21/31 |
| 2020/0143036 A1* | 5/2020 | Sunkavally | ............. | G06F 21/46 |

OTHER PUBLICATIONS

Yassin, A.A. • Hai Jin • Ibrahim, A. • Weizhong Qiang • Deqing Zou; A Practical Privacy-preserving Password Authentication Scheme for Cloud Computing; 2012 IEEE 26th International Parallel and Distributed Processing Symposium Workshops & PhD Forum (pp. 1210-1217); (Year: 2012).*

Takahiro Arai • Satoshi Obana; A Password-Protected Secret Sharing Based on Kurosawa-Desmedt Hybrid Encryption; 2016 Fourth International Symposium on Computing and Networking (CANDAR) (pp. 597-603); (Year: 2016).*

"International Search Report and Written Opinion Issued in PCT Application No. PCT/US2020/054879", dated Jan. 22, 2021, 11 Pages.

* cited by examiner

PRIVATE PASSWORD CONSTRAINT VALIDATION

BACKGROUND

Users that request access to sensitive resources are typically authenticated prior to accessing that resource. This gives some assurance that users will not be given unauthorized access to that resource. One common way of authenticating a user is to ask them for a password. For instance, if a user logs onto their own laptop, the user might present a valid password recognized by that laptop as authorizing the laptop to be unlocked. While there are other methods for authenticating a user (such as two factor authentication, certificate-based authentication) password-based authentication remains popular. However, if an unauthorized user gains access to a password, that unauthorized user may gain unauthorized access to a resource protected by that password.

However, as any user that deals with passwords knows, there is an inherent problem with using passwords. Users would like passwords that are easy to remember, but would also like passwords to remain secure. However, passwords that are easy to remember are also often easy to guess and are therefore unsecure. As a corollary, passwords that are difficult to guess are often difficult for users to remember.

Furthermore, modern computing systems can be employed to quickly determine shorter passwords (e.g., 8 digits in length) by simple brute force, by working through all of the possible permutations until the password for a resource is found. Another way to try to break a password is to perform password spraying by applying a few commonly used passwords to a large number of accounts. While almost all user accounts will not have used those commonly used passwords, there may be one or a few that do. For those that do, their password has been broken.

Password validation might employ complexity rules to ensure that passwords have a certain minimum level of complexity and are thus difficult to guess. Such might require passwords to be a minimum length, have a certain minimum number of different types of characters, be different than recently used passwords, and so forth. Often, a visually bright green indicator gives the user a visual indication that they have entered a sufficiently complex password. However, these complexity rules may be too simple, leaving it still rather easy to guess what the password is. In another conventional technique, a user may provide a password to a password validation service. The service will then compare the password against a list of bad passwords to see if the password is in that list. If the password is in that list, the password is not permitted, and the user may then alter the password or pick a new password.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to privately determining whether a password satisfies a constraint without having to divulge the password itself to a third party (e.g., a server or service) that evaluates the constraint, and without the third party even being aware of the result of the evaluation. As an example, a password may be validated by a third party as sufficiently secure (e.g., satisfies certain rules, is not a weak password, or is not a breached password) without that third party needing to actually know the password, nor even whether the password satisfies the constraint. Thus, users can keep passwords securely to themselves, while still being able to rely on a third party to validate that the password is safe to use.

After the user selects a password, private communication (e.g., private information retrieval or multi-party computation) is used to determine whether the selected password satisfies password constraints. For instance, the password might be encrypted (e.g., homomorphically), and then the encrypted password and a function definition (e.g., a homomorphic function definition) are then provided to the third party. The third party then performs the function and returns an already encrypted result. The third party generated the encrypted result directly, without having access to the result in the clear. Upon receiving the encrypted result, the user's computing system may then decrypt the result, to find out whether the password satisfies the constraints, and thus is sufficiently safe to use.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to privately determining whether a password satisfies a constraint without having to divulge the password itself to a third party (e.g., a server or service) that evaluates the constraint, and without the third party even being aware of the result of the evaluation. As an example, a password may be validated by a third party as sufficiently secure (e.g., satisfies certain rules, is not a weak password, or is not a breached password) without that third party needing to actually know the password, nor even whether the password satisfies the constraint. Thus, users can keep passwords securely to themselves, while still being able to rely on a third party to validate that the password is safe to use.

After the user selects a password, private information retrieval is used to determine whether the selected password satisfies password constraints. For instance, the password might be encrypted (e.g., homomorphically), and then the encrypted password and a function definition (e.g., a homomorphic function definition) are then provided to the third party. The third party then performs the function and returns an already encrypted result. The third party generated the encrypted result directly, without having access to the result in the clear. Upon receiving the encrypted result, the user's computing system may then decrypt the result, to find out whether the password satisfies the constraints, and thus is sufficiently safe to use.

Figure 1:
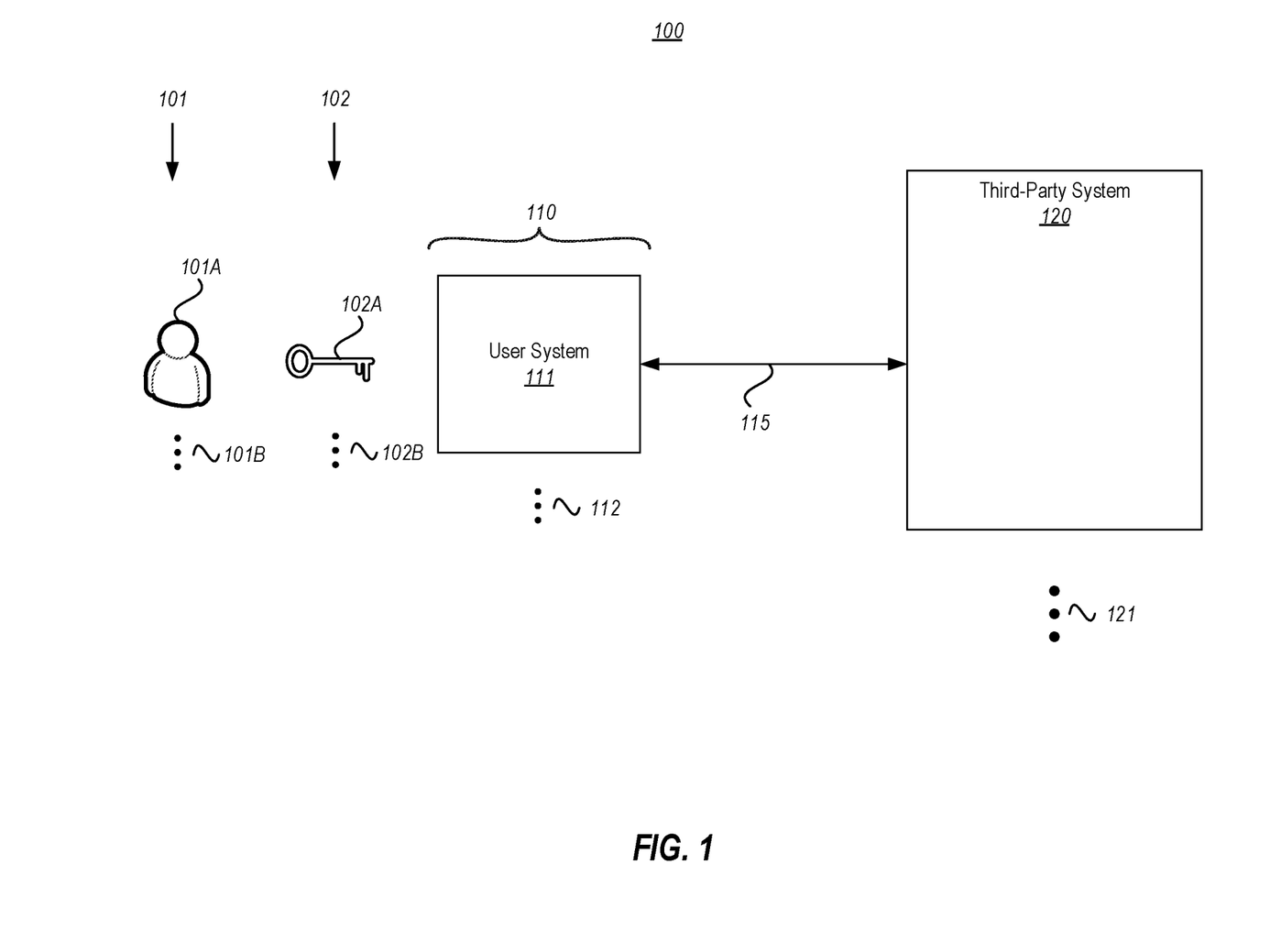
FIG. 1 illustrates a network environment in which the principles described herein may be practiced, which includes a third-party system that communicates with user systems over a network.

FIG. 1 illustrates a network environment 100 in which the principles described herein may be practiced. The network environment 100 includes a third-party system 120 that communicates with user systems 110 (including user system 111) over a network 115. The third-party system 120 operates to validate whether passwords 102 selected by the users 101 satisfy one or more constraints without the third-party system 120 needing to know the passwords 102, nor needing to know the results of the validation. The third-party system 120 might be a server computing system, which might be structured as described below for the computing system 800 of FIG. 8. However, a server may not use a user interface, such as the user interface 812 of FIG. 8. Alternatively, or in addition, the third-party system 120 might be a service such as a cloud computing service offered in a cloud computing environment. The user systems 110 may also each be any computing system, and may also be structured as described below for the computing system 800 of FIG. 8.

In an example referred to herein as the "subject example", the user system 111 has a user 101A that has selected a password 102A, and will use the third-party system 120 to determine whether the selected password 102A satisfies a constraint. As an example, the password may be validated to ensure it is sufficiently strong and secure.

For instance, the user 101A might use the third-party system 120 to determine whether or not the password 102A satisfies complexity rules (e.g., is of sufficient length, has a minimum number of characters of particular types, and so forth). Alternatively, or in addition, the user 101A might use the third-party system 120 to determine whether or not the password 102A is within a list of passwords (such as a list of weak and easily guessable passwords, or a list of breached passwords).

Again, the user 101A uses the third-party system 120 to do this without risking providing the password 102A to the third-party system 120 in the clear. Furthermore, the third-party system 120 itself does not even have a feasible way of determining the result, even though the user system 111 can determine the result from information provided by the third-party system 120.

Figure 2:
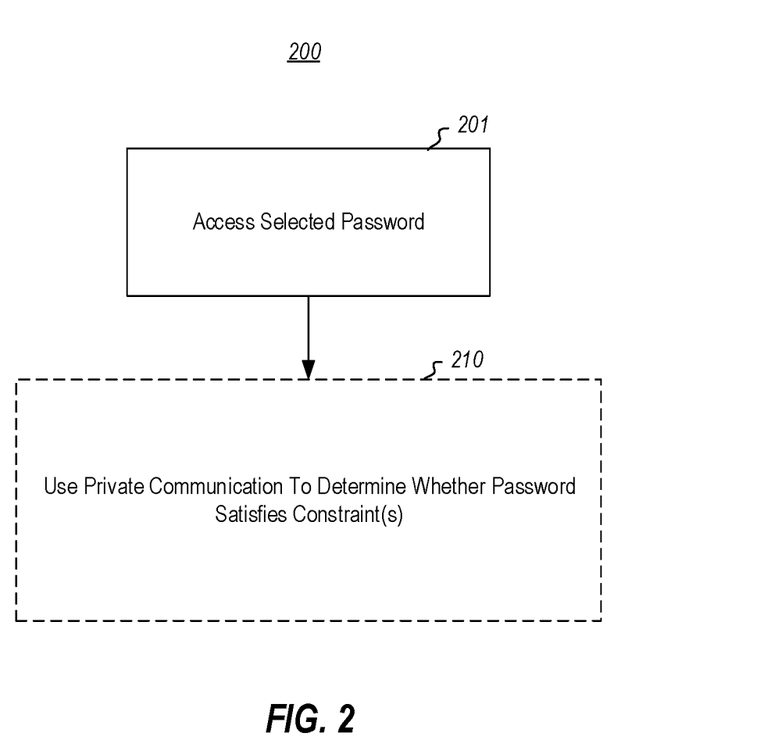
FIG. 2 illustrates a flowchart of a method for privately determining whether a password satisfies a constraint, in accordance with the principles described herein.

FIG. 2 illustrates a flowchart of a method 200 for privately determining whether a password satisfies one or more constraints, in accordance with the principles described herein. The method 200 may be performed by the user system 111 of FIG. 1, and thus will be described with respect to FIG. 1. The user system 111 may be structured as described below for the computing system 800 of FIG. 8. In that case, the method 200 may be performed by one or more processors (e.g., the hardware processing unit 802) of the computing system 800 executing computer-executable instructions that are on one or more computer-readable media (e.g., memory 804).

The method 200 includes an act of accessing a password selected by a user (act 201). As an example, in FIG. 1, the user system 111 accesses a password 102A selected by the user 101A. Then, the method 200 includes a step 210 for using private communication to determine whether the selected password satisfies one or more password constraints (step 210). This step 210 may also be performed by the user system 111 using information obtained from the third-party system 120. This step 210 is represented using dashed-lined borders to represent that it is a functional, result-oriented, step that includes corresponding acts that are further described herein.

Figure 3:
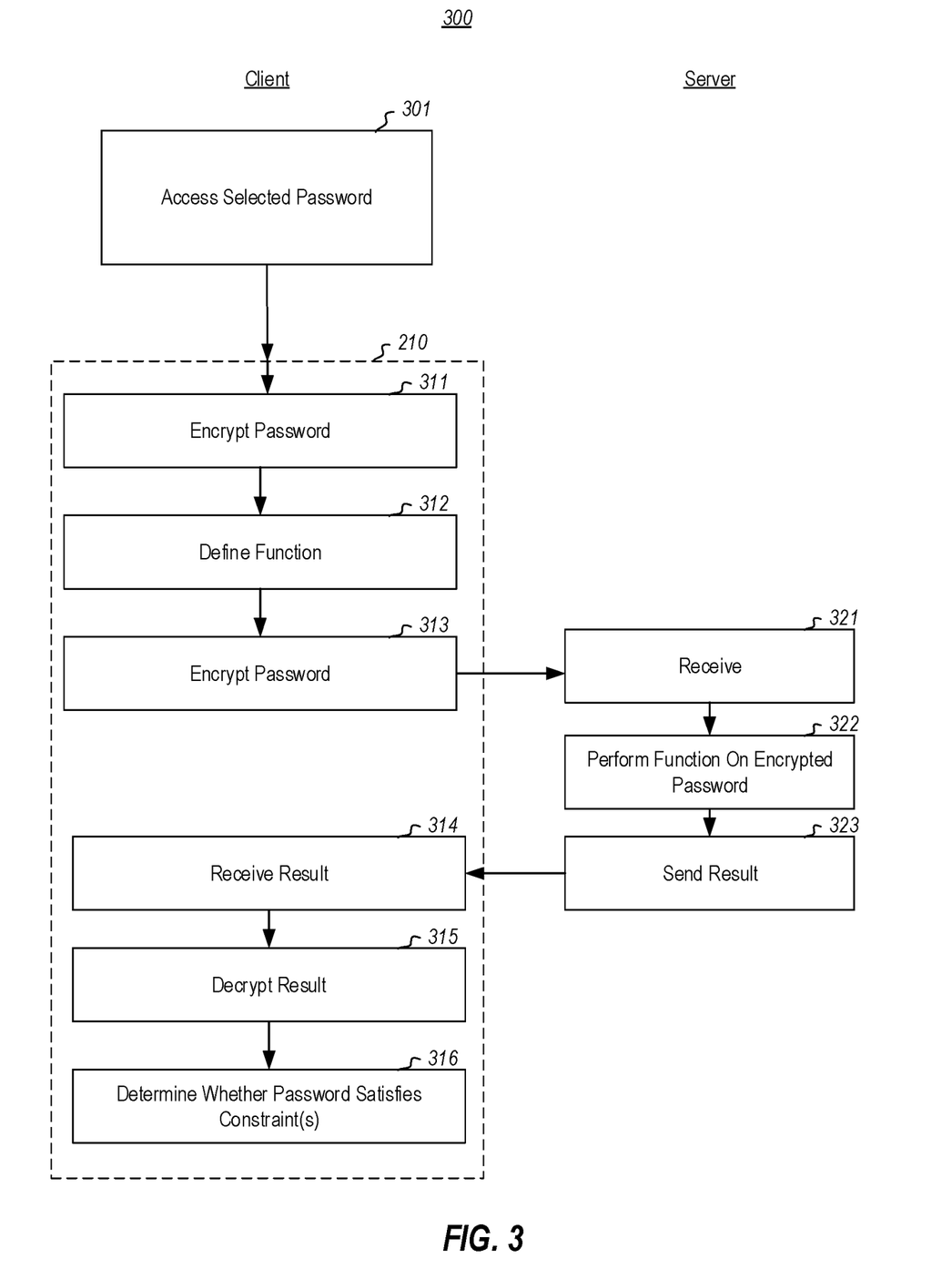
FIG. 3 also illustrates a flowchart of a method for privately determining whether a password satisfies a constraint, in accordance with the principles described herein.

FIG. 3 also illustrates a method 300 for privately determining whether a password satisfies one or more constraints, in accordance with the principles described herein. The method 300 is similar to the method 200 of FIG. 2. However, in the case of the step of privately communicating (step 210) being private information retrieval, step 210 shows further corresponding acts performed by the user system in order to perform the step 210 are illustrated within the dashed-lined box. Acts that are performed by the user system (e.g., the user system 111 of FIG. 1 in the subject example) are illustrated in the left column under the header "Client". However, the principles described herein are not limited to the private communication being handle by private information retrieval. For example, the private communication may instead by multi-party computation instead.

In addition, acts performed by the third-party system (e.g., the third-party system 120 of FIG. 1 in the subject example) are also illustrated and are included in the right column under the header "Server". The third-party system 120 may also be structured as described below for the computing system 800 of FIG. 8. In that case, the acts listed in the right column of FIG. 2 may be performed by one or more processors (e.g., the hardware processing unit 802) of the computing system 800 executing computer-executable instructions that are on one or more computer-readable media (e.g., memory 804).

The method 300 also includes accessing the selected password (act 301) which is the same as the act of accessing the selected password (act 201) of FIG. 2. In the subject example, the user system 111 accesses the password 102A that was selected by the user 101A. Remaining acts performed by the user system are performed as part of the step for using private information retrieval to determine whether the selected password satisfies password constraints (step 210), which are illustrated inside the dashed-lined box.

The user system then encrypts the selected password (act 311). In the subject example of FIG. 1, the user system 111 encrypts the password 102A. In one embodiment, the encryption is homomorphic encryption, which is a form of encryption that allows computation on the encrypted data (in this case the encrypted password) so as to generate an encrypted result which, when decrypted, matches the result of the computation as if the computation had been performed on the original data (in this case, on the original unencrypted password 102A). However, the result might also be computed using private set intersection as well.

Figure 4:
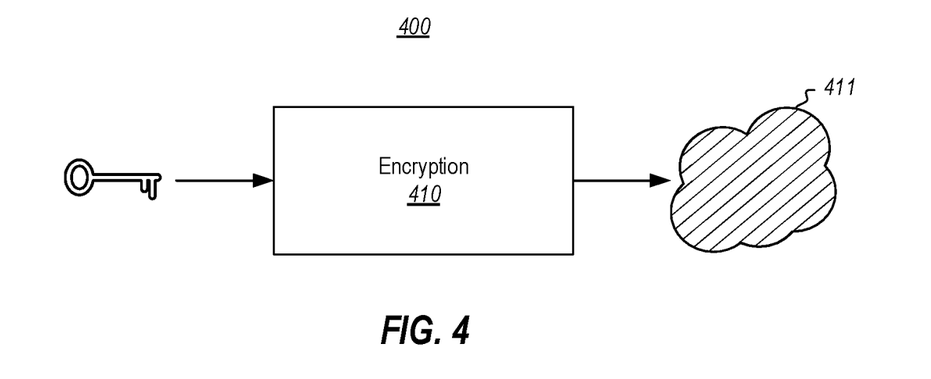
FIG. 4 illustrates an encryption process in which an encryption component encrypts the password to generate the encrypted password.

FIG. 4 illustrates an encryption process 400 in which an encryption component 410 encrypts the password 102A to generate the encrypted password 411. If the user system 111 is structured as described below for the computing system 800 of FIG. 8, the encryption component 410 may be as described below for the executable component 806 of FIG. 6.

The password 102A is represented as a key because it can be seen in the clear. However, encrypted password 411 is represented as a blob with rightward diagonal fill lines, representing that encrypted password 411 obfuscates the actual password 102A. Accordingly, the third-party system, which will later access the encrypted passwords 411 cannot ascertain what the password 102A actually is. Thus, access to the encrypted password 411 does not imply access to the password 102A to systems (such as third-party system 120) that do not have the ability to decrypt the password 411.

The user system also defines a function to be performed by the third-party system on the encrypted password (act 312). This function is a homomorphic function in that it conforms with a set of computations that, when performed on the homomorphically encrypted password, provides a result that, when decrypted, matches the result that would happen if the homomorphic function were performed directly on the plain data (e.g., the password 102A in unencrypted form) itself. As an example, the homomorphic function could be a homomorphic verification of complexity rules for the password. As another example, the homomorphic function could be a homomorphic lookup for the password within a list of passwords (e.g., a list of weak passwords, and/or a list of breached passwords).

The encrypting of the password (act 311) and the defining of the function (act 312) are illustrated as occurring one after the other. However, the principles described herein are not limited to that temporal relationship. For example, if the user system 111 only looks up whether the password is in a list of passwords, the function may be predetermined (act 311) even well before the user selected the password (act 301). That function might not even change as the user(s) selects one password after another for repeat performances of the method 300 to verify whether any number of passwords satisfies the constraints.

On the other hand, the user might verify a number of different constraints on a single password. For example, the user might first verify that a password is not in a list of weak passwords, then verify that a password satisfies complexity rules, and then verify that the password is not in a list of breached passwords. Thus, the method 300 after act 311 may be repeated multiple times for a single selected password. As an example, the list of weak passwords might be on a different third-party system than the list of breached passwords, causing the encrypted password to be sent (with different functions) to each of multiple third-party systems.

Figure 5:
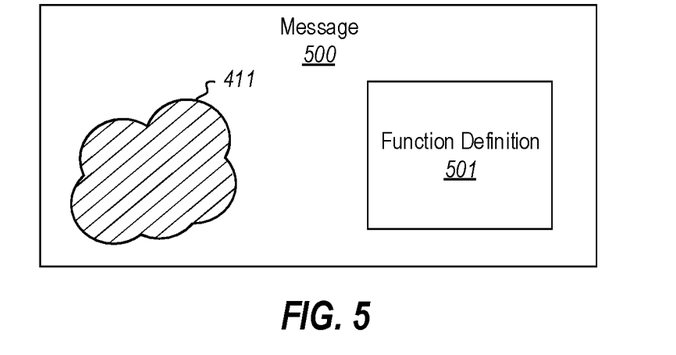
FIG. 5 illustrates an example message that may be sent to the third-party system, which message includes the encrypted password as well as a function definition.

The user system then causes the encrypted password and a function definition of the defined function to be sent to a third-party system for performing the defined function on the encrypted password (act 313). In the subject example of FIG. 1, the user system 111 sends the encrypted password and the function over the network 115 to the third-party system 120. FIG. 5 illustrates an example message 500 that may be sent as part of this act, which message includes the encrypted password 411 as well as a function definition 501.

The third-party system receives the encrypted password and function definition (act 321), performs the defined function on the encrypted password (act 322), and sends the result back to the user system (act 323). In the subject example, the third-party system 120 receives the message (e.g., message 500) from the user system 111, performs the defined function (specified by the function definition 501) on the encrypted password 411, and sends the result of that operation over the network 115 back to the user system 111.

Figure 6:
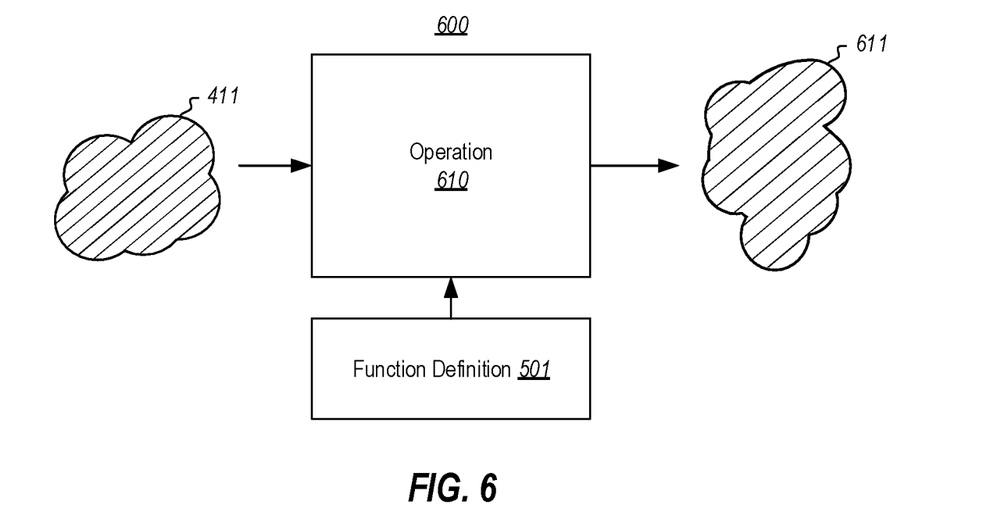
FIG. 6 illustrates a process in which an operation component interprets the function definition, and performs the defined operation on the encrypted password to generate a result.

FIG. 6 illustrates a process 600 in which an operation component 610 interprets the function definition 501, and performs the defined function on the encrypted password 411 to generate a result 611. If the third-party system 120 is structured as described below for the computing system 800 of FIG. 8, the operation component 610 may be as described below for the executable component 806 of FIG. 6. The result 611 is again shown as a blob, though a different blob than was used to represent the encrypted password 411. This represents that though an operation was performed, the result of the operation is still not clear without the ability to decrypt the result.

Thus, in the case of applying complexity rules, the third-party system 120 does not know the password, nor whether the password actually satisfies the complexity rules. In the case of looking up the password in a list, the third-party system 120 does not know the password, nor whether the password is in its list of passwords. Thus, the password remains safe, even from the third-party system, and there is no need to even have to trust the third-party system. For instance, even though the third-party system may have access to a list of passwords in the clear, and the encrypted password is checked against that list, the third-party system still cannot use the list of passwords to somehow guess what the password is.

The user system then receives the result of the operation (act 314). In the subject example, the user system 111 receives the result (e.g., result 611) of the defined function (e.g., defined by the function definition 501) performed on the encrypted password (e.g., encrypted password 411).

Figure 7:
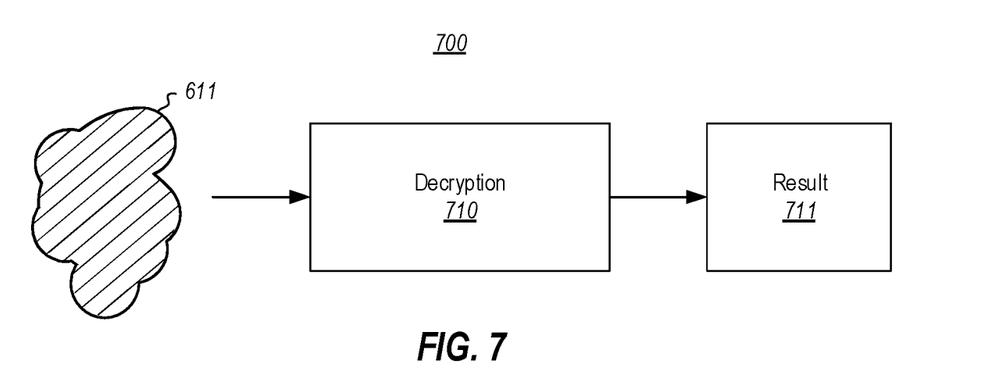
FIG. 7 illustrates a process in which a decryption component decrypts the result to obtain the plain text result, which may then be used to determine whether the password satisfies the constraint.

Now, in the case of homomorphic encryption being performed on the password, and in the case of the function falling within the set of operations that maintain the homomorphic properties, the user system only has to decrypt the result (act 315) in order to determine whether the password satisfies the one or more constraints (act 316). For example, FIG. 7 illustrates a process 700 in which a decryption component 710 decrypts the result 611 to obtain the plain text result 711. If the user system 111 is structured as described below for the computing system 800 of FIG. 8, the decryption component 710 may be as described below for the executable component 806 of FIG. 8.

The decryption performed by the decryption component 710 may likewise follow the same homomorphic encryption scheme that the encryption component 410 used to encrypt the password. Thus, the plain text result 711 is a result that the defined function would produce if performed directly on the plain text password 102A.

Returning to FIG. 1, the ellipsis 112 represents that the user systems 110 may include any number of user systems that employ the principles described herein (e.g., performing method 200 or the left column of method 300) in order to validate passwords selected by their users. Likewise, the ellipsis 121 represents that there may be any number of third-party systems that operate within the environment 100 to employ the principles described herein. For instance, a third-party system may help validate passwords selected by users of any number of user systems. Furthermore, a single user system may be used by several third-party systems to validate whether a selected password satisfies constraints. The ellipsis 102B represents that a single user may validate any number of passwords using the principles described herein. The ellipsis 101B represents that a single user system may have any number of users that select passwords subject to the principles described herein, and that any number of user systems with any number of users may select passwords subject to the principles described.

Thus, the principles described herein allow a user to use a third-party system to check whether a password satisfies constraints without needing to disclose the password itself to the third-party system, and without the third-party system ever finding out whether the password satisfies the constraint. Accordingly, the principles described herein provide a secure way to perform validation of a selected password thereby allowing for stronger passwords to be chosen, thereby improving the security of resources that are guarded by those passwords.

In one embodiment, the result 711 is just a simple Boolean value representing whether or not the password satisfies the one or more constraints (e.g., whether or not the password is in the list of passwords and/or whether or not the password satisfies complexity rules). However, in order to improve latency, and network usage, and simplify the defined function, the result 711 might instead include an intermediate result that requires further processing by the user system prior to the final determination. As an example, the intermediate result might include a smaller list of passwords that the user system must check through to verify whether the password is in that smaller list. If the password is in that smaller list within the result, that means that the password was in the larger list maintained at the third-party system. Likewise, if the password is not in the smaller list, this means that the password was not in the larger list maintained at the third-party system. This option might perhaps be better employed when the smaller list includes only a list of weak passwords that are easy to guess, as opposed to a list of breached passwords that are sensitive to divulge to anyone.

In order to reduce latency in responding to request to validate a password, there may be some pre-processing that is performed between the third-party system and the user system. For instance, the third-party system and the user system may agree on communication patterns (such as network ports, maximum message size, whether messages are to be confirmed as received, and so forth) that are related to the basic processes of communication. In addition, the third-party system and the user system may agree on other matters that help the user system construct a function, such as how many passwords are within a list of passwords, what the library of available homomorphic operations is, and so forth.

Note that the performance of the methods 200 and 300 may be performed by a computing system. Accordingly, a computing system will now be described with respect to FIG. 8. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 8:
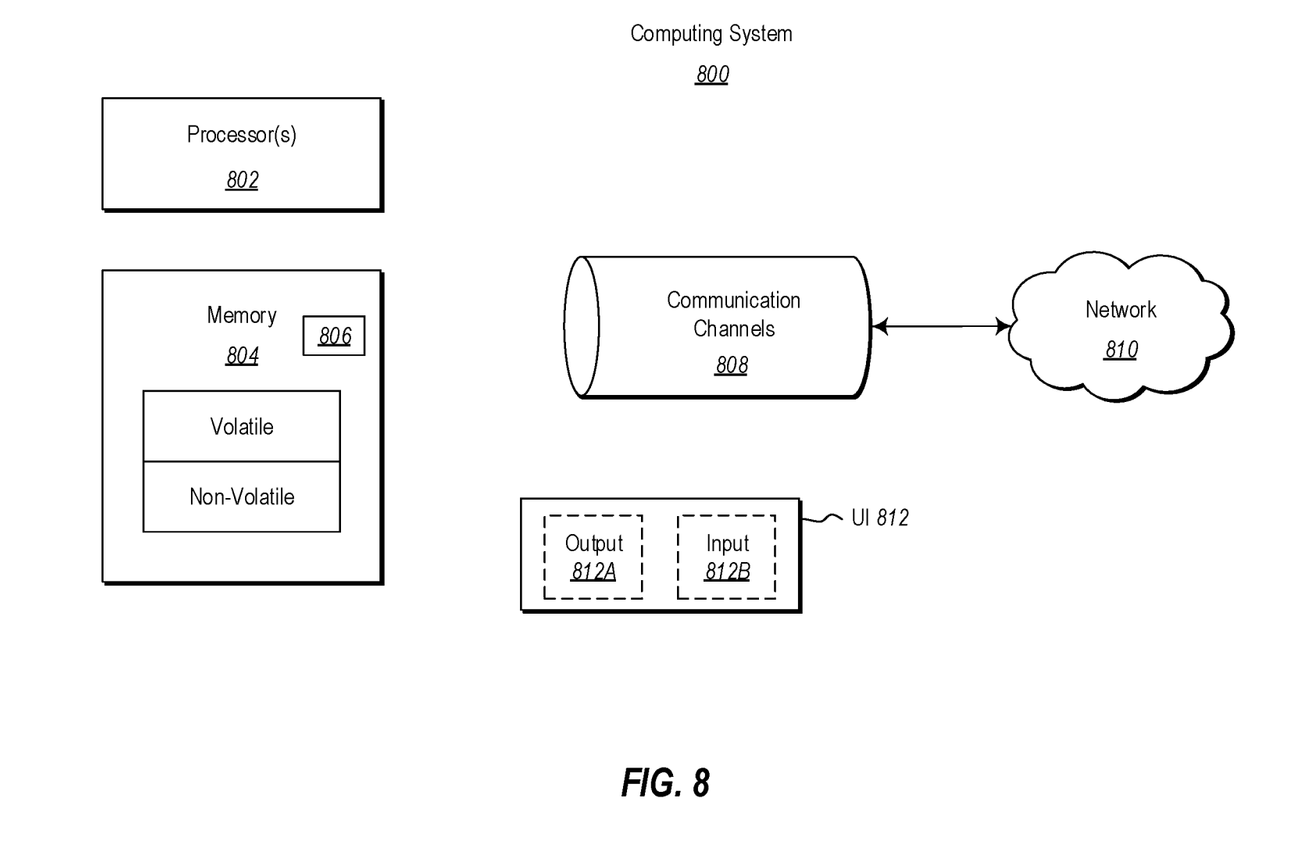
FIG. 8 illustrates an example computer system in which the principles described herein may be employed.

As illustrated in FIG. 8, in its most basic configuration, a computing system 800 typically includes at least one hardware processing unit 802 and memory 804. The memory 804 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 800 has thereon multiple structures often referred to as an "executable component". For instance, the memory 804 of the computing system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 804 of the computing system 800. Computing system 800 may also contain communication channels 808 that allow the computing system 800 to communicate with other computing systems over, for example, network 810.

While not all computing systems require a user interface, in some embodiments, the computing system 800 includes a user interface 812 for use in interfacing with a user. The user interface 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms, virtual reality, and so forth. Examples of input mechanisms 812B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that facilitates a determination as to whether a password satisfies a password constraint without divulging the password to a third party remote server, said computing system comprising:
   one or more hardware processors; and
   one or more computer-readable hardware storage devices that store computer-executable instructions that are executable by the one or more hardware processors to cause the computing system to:
   access a password;
   encrypt the password;
   generate a function definition defining a function, wherein:
   the function is structured for execution by a remote server,
   the function is structured for execution on the encrypted password, and
   the function is structured such that, when executed by the remote server, the function operates to determine whether the password is not in a list of passwords;
   prior to transmitting the encrypted password to the remote server, perform a pre-processing operation that reduces a potential for latency, wherein the pre-processing operation includes facilitating an agreement between the computing system and the remote server regarding a library of available operations, the library of available operations comprising operations that are permitted to be used when the function is constructed;
   transmit the encrypted password to the remote server;
   transmit the function definition to the remote server to trigger the remote server to execute the function, which is defined by the function definition, on the encrypted password, wherein, as a result of the encrypted password remaining encrypted while in possession by the remote server and as a result of the remote server executing the function against the encrypted password, the password is prevented from being divulged to the remote server, including during a time when the remote server is executing the function against the encrypted password;
   detect receipt of an encrypted result of the function on the encrypted password;
   decrypt the received encrypted result received from the remote server, the decrypted result being a Boolean value representing that the password is in the list of passwords; and
   based on the decrypted result, determine that the password is not validated for use as a result of the password being in the list of passwords.

2. The computing system in accordance with claim 1, the list of passwords comprising a list of weak passwords.

3. The computing system in accordance with claim 1, the list of passwords comprising a list of breached passwords.

4. The computing system in accordance with claim 1, wherein encrypting the password includes homomorphically encrypting the password, and wherein the lookup function includes a homomorphic lookup function.

5. The computing system in accordance with claim 1, wherein the decrypted result includes a plurality of passwords.

6. The computing system in accordance with claim 5, the list of passwords including a list of weak passwords, the plurality of passwords including a plurality of weak passwords.

7. The computing system in accordance with claim 5, wherein the computing system is further configured to:
   prior to transmitting the encrypted password and the function definition, configure the passwords in the plurality of passwords.

8. The computing system in accordance with claim 1, wherein encrypting the password includes homomorphically encrypting the password.

9. The computing system in accordance with claim 1, the function being a homomorphic function.

10. The computing system in accordance with claim 1, the encrypted result being generated using private set intersection.

11. A method for privately looking up whether a password satisfies one or more constraints without divulging the password to a third party remote server, the method comprising:
    accessing a password;
    encrypting the password;
    generating a function definition defining a function, wherein:
    the function is structured for execution by a remote server,
    the function is structured for execution on the encrypted password,
    the function is structured such that, when executed by the remote server, the function operates to determine whether the password is not in a list of passwords;
    prior to transmitting the encrypted password to the remote server, performing a pre-processing operation that reduces a potential for latency, wherein the pre-processing operation includes facilitating an agreement between the computing system and the remote server regarding a library of available operations, the library of available operations comprising operations that are permitted to be used when the function is constructed;
    transmitting the encrypted password to the remote server;
    transmitting the function definition to the remote server to trigger the remote server to execute the function, which is defined by the function definition, on the encrypted password, wherein, as a result of the encrypted password remaining encrypted while in possession by the remote server and as a result of the remote server executing the function against the encrypted password, the password is prevented from being divulged to the remote server, including during a time when the remote server is executing the function against the encrypted password;
    detecting receipt of an encrypted result of the function on the encrypted password;

decrypting the received encrypted result received from the remote server, the decrypted result being a Boolean value representing that the password is in the list of passwords; and based on the decrypted result, determining that the password is not validated for use as a result of the password being in the list of passwords.

12. The method in accordance with claim 11, wherein encrypting the password includes homomorphically encrypting the password, the function comprising a homomorphic lookup function.

13. The method in accordance with claim 11, the decrypted result including a plurality of passwords.

14. One or more hardware storage devices that store instructions that are executable by one or more processors of a computer system to cause the computer system to:

access a password;

encrypt the password;

generate a function definition defining a function, wherein:

the function is structured for execution by a remote server, the function is structured for execution on the encrypted password, and the function is structured such that, when executed by the remote server, the function operates to determine whether the password is not in a list of passwords;

prior to transmitting the encrypted password to the remote server, perform a pre-processing operation that reduces a potential for latency, wherein the pre-processing operation includes facilitating an agreement between the computing system and the remote server regarding a library of available operations, the library of available operations comprising operations that are permitted to be used when the function is constructed;

transmit the encrypted password to the remote server;

transmit the function definition to the remote server to trigger the remote server to execute the function, which is defined by the function definition, on the encrypted password, wherein, as a result of the encrypted password remaining encrypted while in possession by the remote server and as a result of the remote server executing the function against the encrypted password, the password is prevented from being divulged to the remote server, including during a time when the remote server is executing the function against the encrypted password;

detect receipt of an encrypted result of the function on the encrypted password;

decrypt the received encrypted result received from the remote server, the decrypted result being a Boolean value representing that the password is in the list of passwords; and based on the decrypted result, determine that the password is not validated for use as a result of the password being in the list of passwords.

\* \* \* \* \*